Figure 3:
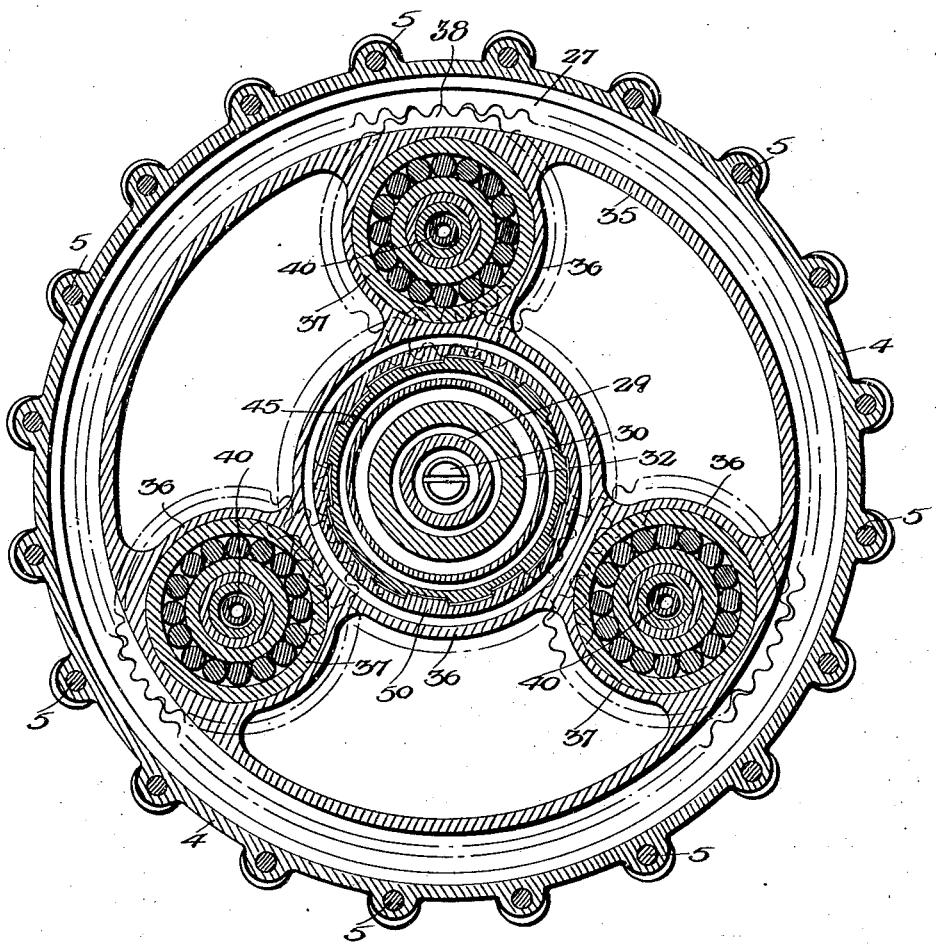

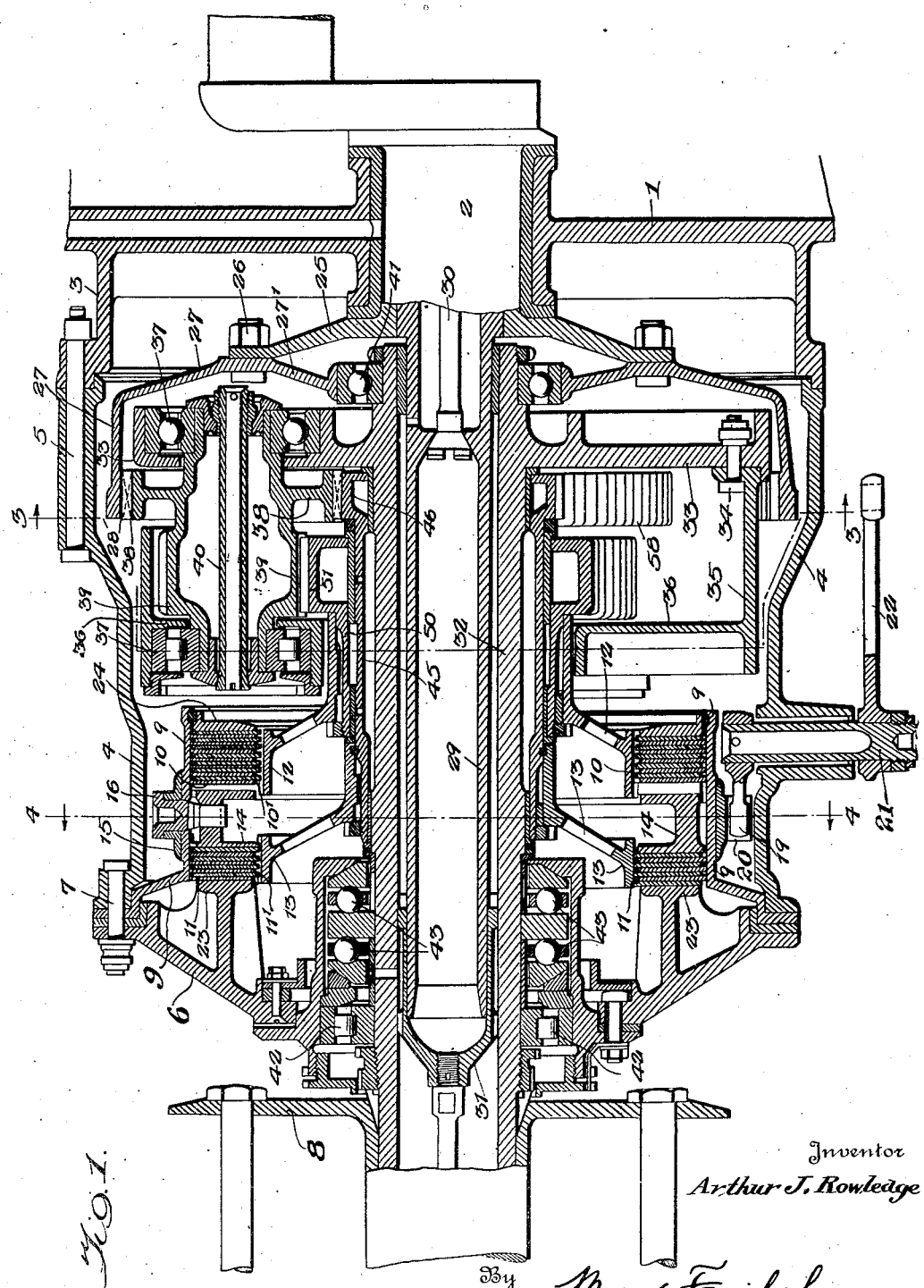

Dec. 27, 1927.　　　　　　　　　　　　　　　　　　　1,654,432
A. J. ROWLEDGE
GEARING FOR PROPELLING AIRCRAFT
Filed June 9, 1924　　　　3 Sheets-Sheet 2
Fig. 4.
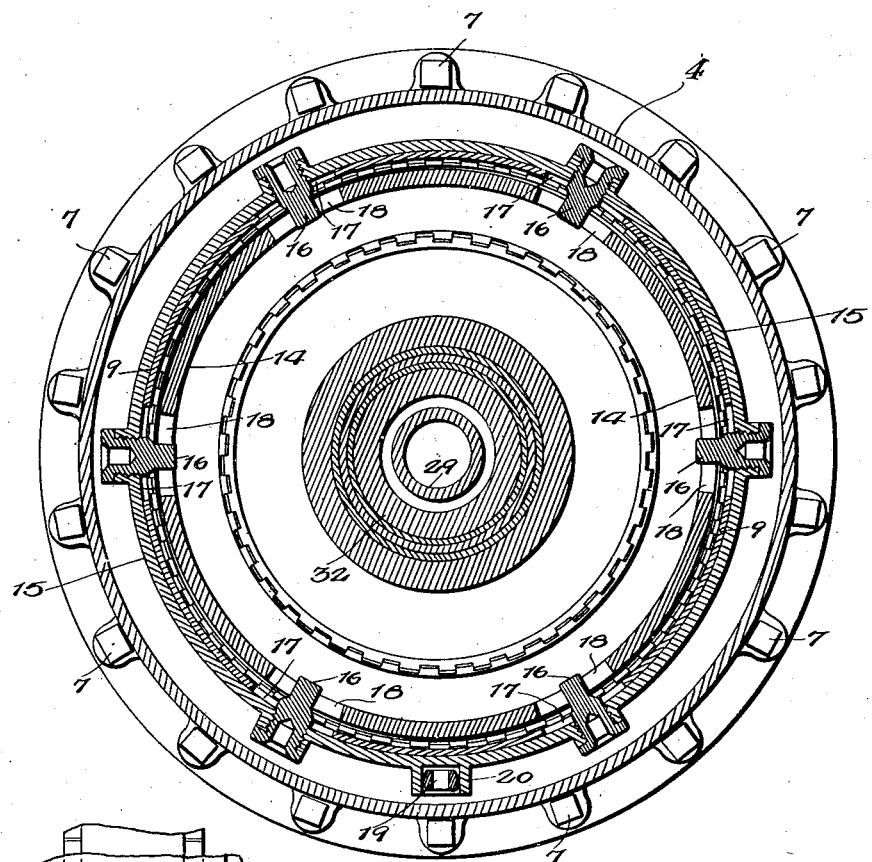
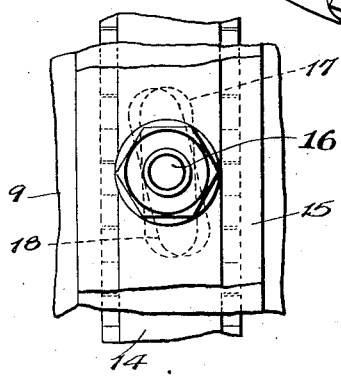
Fig. 2.
Inventor
Arthur J. Rowledge
By Mason Fenwick & Lawrence,
Attorneys Dec. 27, 1927.
A. J. ROWLEDGE
1,654,432
GEARING FOR PROPELLING AIRCRAFT
Filed June 9, 1924
3 Sheets-Sheet 3

Inventor
Arthur J. Rowledge

By Mason Fenwick Lawrence,
Attorneys

Patented Dec. 27, 1927.

1,654,432

UNITED STATES PATENT OFFICE.

ARTHUR JOHN ROWLEDGE, OF DERBY, ENGLAND, ASSIGNOR TO ROLLS ROYCE LIMITED, OF DERBY, ENGLAND, A COMPANY OF GREAT BRITAIN.

GEARING FOR PROPELLING AIRCRAFT.

Application filed June 9, 1924, Serial No. 718,922, and in Great Britain July 23, 1923.

It is well known that a two speed gear for an aero engine would give important practical advantages but hitherto no successful change speed gear for the purpose has been made.

This invention is a form of epicyclic reduction gear and consists in having in the gear two sun wheels of different diameters with stepped planets which are mounted in a carriage or frame fixed to the driven shaft and are driven by an annulus fixed to the engine or driving shaft with means consisting of friction brakes for fixing exclusively one or the other of the sun wheels in relation to the case.

In apparatus made according to my invention there is provided a pair of sun wheels or gears one of which is mounted loose on the driven shaft along which extends from the sun wheel a sleeve shaft to which is affixed a wheel or drum carrying friction plates cooperating with complementary plates supported by the casing whereby through the instrumentality of the plates the sun gear can be held from rotation. The other sun wheel is mounted on the said sleeve and provided with a similarly extended sleeve at the end of which is affixed a drum which in like manner can be fixed with respect to the casing to hold the sun wheel from rotation. Mechanism worked by a lever is arranged to operate by one or the other of the brakes.

In the accompanying drawings is shown an example of the invention. Figure 1 is a vertical section through the middle of the complete gear; Figure 2 is an elevation of a portion of the clutch operating mechanism showing internal members in dotted lines drawn on an enlarged scale; Figure 3 is a section on line III of Figure 1 viewed from the left hand; and Figure 4 is a section on line IV of Figure 1 viewed from the right hand. In all the drawings like reference characters refer to like parts.

Numeral 1 indicates the casing of the crank shaft chamber; 2 the crank shaft mounted therein; 3 a cylindrical extension integral with the casing 1; 4 a cylindrical casing bolted to the casing 3 as by bolts 5; 6 an end cover or casing bolted to the casing 4 as by bolts 7; and 8 the propeller to be driven. Secured to the casing members above described by the bolts 7 is a cylindrical member 9 having two sets of spaced radial friction disks or plates 10 and 11 non-rotatably secured thereto adapted to coact with similar plates 10' and 11' non-rotatably mounted on annular members 12 and 13 forming part of mechanisms hereinafter more fully described.

Mounted between the respective sets of friction plates is a U-shaped ring 14 adapted to be moved against one or the other sets of cooperating friction plates by mechanism comprising a manually rotatable ring 15 on the annular member 9, said ring having a series of inwardly extending radial studs 16 which extend through circumferential slots 17 in the annular member 9 and through angularly disposed circumferential slots 18 in the U-shaped ring 14. The ring 15 is rotated by means of a crank arm 19 having its terminal received between lugs 20 projecting outwardly from the said ring. The crank arm is secured to a spindle 21 mounted in the casing 4 and the spindle is rotated by an arm 22 affixed thereto. Disposed on one side of the set of friction plates 11, 11' is a stop member 23 extending inwardly from the cap or casing 6 and for the other set of friction plates is a stop member 24 in the nature of ring plate affixed to the annular member 9, the purpose of these stop members being obvious to those skilled in the art.

Integral with the crank shaft 2 is a radial flange 25 and secured thereto by bolts 26 is an annular member 27 having internal gear teeth 28. The crank shaft has a hollow extension 29 secured by suitable means including a bolt 30 which extension is capped by an end piece 31. Mounted loose with respect to the crank shaft is a planet carrier, the hub or sleeve of which is indicated by numeral 32. Extending radially from the said sleeve is a flange 33 to which is secured as by bolts 34 an annular member 35 having an inwardly directed flange 36.

Mounted across the flanges 33 and 36 in suitable bearing 37 are three planet wheels or gears each comprising two gears 38 and 39 of different diameters mounted on a single hub which is hollow and has extending therethrough a bolt or tie 40 which serves to secure the ball races on the ends of the hub in place.

On the end of the planet carrier sleeve 32 adjacent the radial flange 33 is a ball bearing 41 which supports said sleeve in an inwardly directed flange or web 27' of the annular member 27. The other end of the sleeve 32 is supported in the casing or cap 6 by a roller bearing 42 and against end thrust by ball bearings 43.

Mounted loose on the planet carrier sleeve 32 is a sleeve 45 having at one end a pinion 46 in mesh with the gear 38 which latter is also in mesh with the gear teeth 28 on the annulus 27 which is affixed to the crank shaft 2. To the other end of sleeve 45 is non-rotatably affixed the friction-disk-carrying member 13.

From the above description it will be apparent that when the sleeve 45 is held against rotation through the action of the friction disks 11 and 11' and associated mechanism—the drawings showing the ring member 14 pressing the said friction disks toward the stop member 23 and thus holding the member 13 from turning—rotary motion will be imparted to the planet carrier (on the sleeve 32 of which is mounted the propeller 8), the planet gear 38 rolling around the sun gear 46 on the sleeve 45 by reason of said gear 38 also being in mesh with the gear teeth 28 on the annular member 27 which is affixed to the crank shaft, said gear 38 in rolling around the sun gear 46 of necessity causing the planet carrier comprising the sleeve 32, flange 33, annular member 35 and flange 36 to rotate with respect to the crank shaft.

Mounted loose on the sleeve 45 is a sleeve 50 to one end of which is non-rotatably affixed the friction-disk-carrying member 12, the other end thereof having integral therewith a pinion 51 in mesh with the planet gear 39. When the sleeve 50 is held against rotation the sleeve 45 will, of course, be free to rotate and vice versa. When the sleeve 50 is held against rotation through the instrumentality of the friction disks 10 and 10' rotation will be imparted to the propeller carrying shaft 32 by reason of the fact that the planet gear 39 will roll around the sun gear 51 on sleeve 50 as the annular member 27 rotates, it being remembered that integral with gear 39 is gear 38 in mesh with the teeth on said annular member, the gear 39 in rolling around said gear 51 causing the planet carrier of which said sleeve 32 is a part to rotate.

It will be understood that the cylindrical member 35 of the planet carrier has suitable openings in its periphery to admit of the planet gears 38 extending therethrough to mesh with the teeth 28 on the annular member 27.

It will also be noted that the sun gears 46 and 51 are of different diameters.

What is claimed is:

1. A speed change gearing comprising a casing, an annular member within the same in fixed relation thereto, two sets of friction plates non-rotatably secured to said member in spaced relation, a pair of wheels each carrying a set of friction plates complementary to the other said plates, means for selectively clamping the complementary sets of plates for holding one or the other of said wheels from rotation, sun gears fixedly connected to each of said wheels, one for each wheel, a planet carrier in which are mounted a plurality of planet gears, each planet gear comprising two gears of different diameters on a single hub, said wheel affixed gears being in mesh with the respective two said gears, and an annular gear in mesh with the larger of said two gears and constituting the main driving gear, said planet carrier having a shaft extending beyond the said wheels.

2. A speed change gearing comprising a casing within which the gearing is housed, an annular member within the casing in fixed relation thereto, a pair of wheels arranged side by side within the annular member in spaced relation thereto, a set of friction plates for each wheel the alternate plates of which are non-rotatably secured to the wheel and annular member, and means for clamping together the plates of one or the other sets of plates including a laterally shiftable plate-engaging ring within the annular member between the said sets of plates, said ring having angularly disposed circumferential slots, and means for shifting said ring including a ring mounted on the annular member for rotation thereon, the latter having circumferential slots, and radial studs extending through the slots in the annular member and into the slots in the plate-engaging ring from the other said ring, whereby as the latter is rotated the ring will be brought into abutting relation with one or the other of said sets of plates to crowd the same together.

3. A speed change gearing comprising a casing, a crank shaft having bearing in one end thereof, a tubular shaft supported at one end by means affixed to the crank shaft and at its other end in the far end of the casing, said tubular shaft having a radial flange and an internally flanged cylindrical member affixed to said flange, a plurality of planet gear shafts supported across said flanges in uniformly spaced relation and each having a pair of gears of different diameters affixed thereon, an annular gear affixed to the crank shaft in mesh with one of the gears of said pair, a pair of sun gears disposed side by side within said flanges and affixed on independent shafts coaxial with the crank shaft, said sun gear shafts projecting beyond the said inwardly projecting flange and having affixed to their ends each a wheel, an annular member affixed to the casing and extending over said wheels in spaced relation thereto, and means supported by said annular member for selectively holding the said wheels against rotation.

4. The structure specified in claim 2, said annular member having an inwardly directed flange forming a stop for one side of one set of plates, and a stop for one side of the other set of plates comprising a member projecting laterally from the casing.

5. A frame, coaxial drive and driven shafts rotatable in said frame, a drive gear fixed to the drive shaft, sun gears of different diameters rotatable independently on said driven shaft, a support fixed to said driven shaft, a stepped planet gear rotatable on said support, and having teeth in mesh with said drive and sun gears, annular clutch members connected to said frame and sun gears and slidable relative to and coaxial with said shafts, and means rotatable on said frame to slide said clutch members and lock any of said sun gears selectively to said frame.

6. A frame, coaxial drive and driven shafts rotatable in said frame, a drive gear fixed to the drive shaft, sun gears of different diameters rotatable independently on said driven shaft, a support fixed to said driven shaft, a stepped planet gear rotatable on said support and having teeth in mesh with said drive and sun gears, cooperating sets of annular clutch members connected to said frame and sun gears, a ring coaxial with said shafts and slidable relatively thereto to engage either of said sets to lock one of said sun gears to said frame, and means rotatable on said frame to slide said ring.

7. A speed change gearing comprising a casing, an annular member fixed within said casing, a pair of wheels arranged side by side within said member and in spaced relation thereto, a set of friction plates for each wheel the alternate plates of which are non-rotatably secured to the wheel and annular member, and means for clamping together the plates of one or the other of said sets including a ring slidably mounted in said annular member, and means rotatable on said member for sliding said ring.

In testimony whereof I affix my signature.

ARTHUR JOHN ROWLEDGE.